Figure 7:
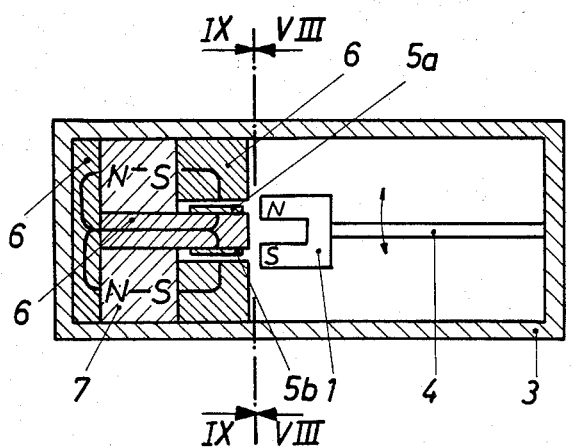

United States Patent [19]

Breitbach et al.

[11] Patent Number: 4,498,341

[45] Date of Patent: Feb. 12, 1985

[54] METHOD AND ARRANGEMENT FOR SENSING THE ACCELERATION OF OSCILLATING BODIES

[75] Inventors: Elmar Breitbach, Göttingen; Ernst-August Dehne, Adelebsen, both of Fed. Rep. of Germany

[73] Assignee: Deutsche Forschungs- u. Versuchsanstalt für Luft-u-Raumfahrt e.V., Porz-Wahn, Fed. Rep. of Germany

[21] Appl. No.: 425,577

[22] Filed: Sep. 28, 1982

Related U.S. Application Data

[63] Continuation of Ser. No. 198,856, Oct. 20, 1980, abandoned, which is a continuation of Ser. No. 55,080, Jul. 5, 1979, abandoned.

[30] Foreign Application Priority Data

Jul. 5, 1978 [DE] Fed. Rep. of Germany ....... 2829425

[51] Int. Cl.³ ............................................. G01P 15/08
[52] U.S. Cl. .................................................. 73/517 R
[58] Field of Search ................. 73/517 R, 516 R, 651, 73/654; 338/43, 46, 32 R, 32 H

[56] References Cited

U.S. PATENT DOCUMENTS

| | | | |
|---|---|---|---|
| 2,552,722 | 5/1951 | King | 264/1 |
| 2,712,601 | 7/1955 | Reinwald | 250/27 |
| 3,025,461 | 3/1962 | Snellen | 324/46 |
| 3,187,254 | 6/1965 | Wasserman | 324/45 |
| 3,331,971 | 7/1967 | Moller | 310/10 |
| 3,867,844 | 2/1975 | Shimizu et al. | 73/517 R |

FOREIGN PATENT DOCUMENTS

| | | | |
|---|---|---|---|
| S 39136 | 11/1955 | Fed. Rep. of Germany | 73/517 R |
| 2241074 | 3/1974 | Fed. Rep. of Germany | 54/5 |
| 45431 | 1/1962 | Poland | 73/517 R |

Primary Examiner—James J. Gill
Attorney, Agent, or Firm—Austin R. Miller

[57] ABSTRACT

A resiliently suspended mass varies the resistance of a pair of ohmic resistors located in a magnetic field by changing the magnetic field by changing position in response to acceleration. The mass may be made of soft iron or contain a magnet to affect the change in the magnetic field.

5 Claims, 12 Drawing Figures

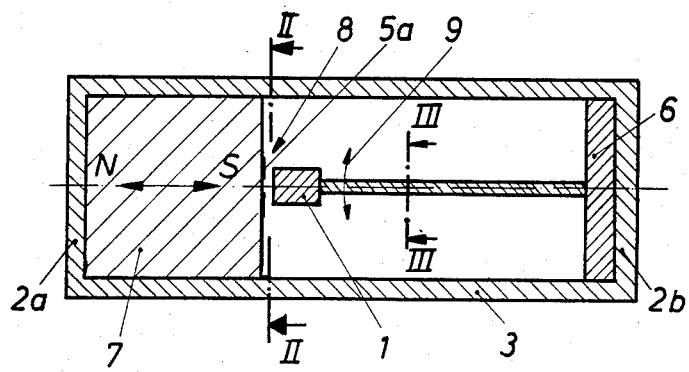
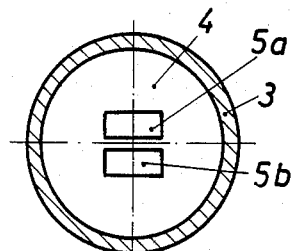
Fig. 1
Fig. 2
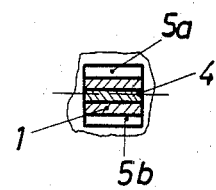
Fig. 3
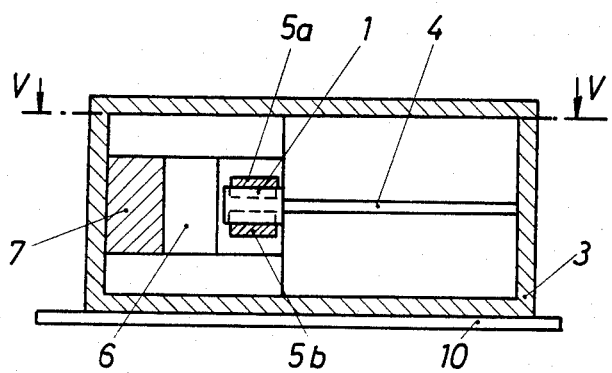
Fig. 4
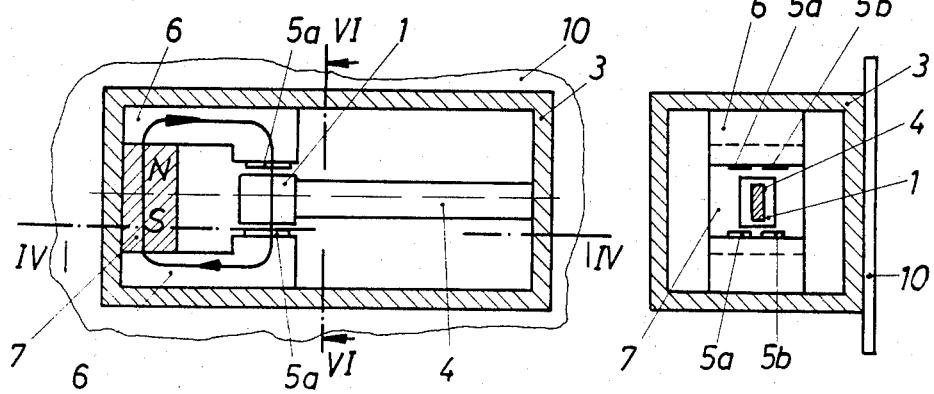
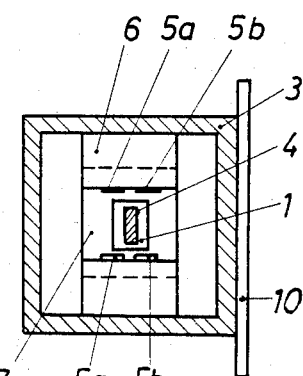
Fig. 5
Fig. 6

METHOD AND ARRANGEMENT FOR SENSING THE ACCELERATION OF OSCILLATING BODIES

This is a continuation of application Ser. No. 198,856 filed 10/20/80, which is a continuation of Ser. No. 055,070, filed 7/5/79, both of which are now abandoned.

This invention pertains to a method for measuring acceleration of oscillating bodies, in which the relative movement between a spring-suspended seismic mass and the corresponding housing connected with the oscillating body is converted into an electrically measurable voltage. A device is present for carrying out the process: Along with the most rigid possible housing and a seismic mass spring-suspended in it is an electrical sensor which responds to the relative movement between the housing and the seismic mass.

Acceleration measuring devices within a rigidly designed housing in which a spring-mass system is suspended are already known. For example, there are sensors which measure the relative movement between the mass and the housing. Some are directly operating sensors, while others are indirectly operating sensors. The direct sensors may be connected to either the mass or the housing, and may be designed as capacitive, inductive or ohmic sensors. When capacitive and inductive sensors are used, a high electrical consumption by the acceleration measuring device results. Although the ohmic sensor is very simple in design, there is a problem of friction with its use.

Examples of devices that are employed as indirect sensors include strain gauges attached in a special application, e.g., on a leaf spring. The strain gauges also pick up the effect of the displacement of the mass and release a corresponding measurement voltage as a measurement signal. However, a great danger of fatigue breakage exists in this case. Additional disadvantages include changes due to aging and, on the whole, a poor long-term lifetime. Other known acceleration measuring devices use as the indirect sensors a piezoelectric element, wherein a crystal forms the spring element. As a result, if acceleration is transmitted to the crystal, the charge distribution in the crystal changes, which after amplification by a charge amplifier, emits a signal proportional to the acceleration. It is obvious that in this case as well a very high measurement expense is required.

An object of the present invention is to provide a process and device of the initially mentioned type, in which the disadvantages discussed are avoided, the electrical or electronic expense is extremely low, and in which a high sensitivity can be achieved. The device for carrying out the process must be simple in construction and design, light in weight and sturdy.

The process disclosed by the invention is characterized by the fact that a magnetic field is set up and the form or intensity of this magnetic field is influenced by the relative movement between the seismic mass and the housing, and that this influence is converted by magnetic field-dependent sensors into the electrically measurable potential. The invention proceeds from the concept that the change in a magnetic field may be transformed into an electrically measurable voltage, since it is simple to construct a magnetic field of this type, and magnetic field dependent sensors are available, which do not require high electrical expenditures.

The effect on the magnetic field can be achieved simply by the relative movement of a soft iron piece. However, it is also possible for the magnetic field to be influenced by the relative movement of another magnetic field. In this connection it is advantageous to spatially separate the parts by providing relatively small air gaps, so that the electrically connected parts can be fixed in location, with the result that the danger of aging and fatigue breakage is largely eliminated.

The magnetic field and/or additional magnetic field-magnetic field combinations may be used in order to increase the sensitivity.

The device for carrying out the invention has the most rigid possible housing, a seismic mass suspended elastically in it, as well as an electrical sensor which responds to the relative movement between the housing and the seismic mass. The device disclosd by the invention is characterized by the fact that the electrical sensor is a magnetic field dependent sensor, preferably a field plate of a Hall generator or system. Such a device creates an advantage since the sensor operates with purely ohmic resistances, with the result that the electrical expenditure is extremely small. When the electrical sensor is arranged on the housing there are no moving electrical parts so that the useful life of the device is prolonged.

The electrical sensor is preferably placed under a preliminary potential so that the stationary magnetic field passes through it. In this manner a steeper characteristic curve is employed, which results in higher sensitivity In a first embodiment of this invention the stationary magnetic field can be formed by having a permanent magnet supported on the housing side, while the seismic mass is attached so that it oscillates perpendicularly to the pole axis of the permanent magnets, and an electrical sensor arranged in the air gap on the pole magnet. This makes it possible to build the device very small. In this embodiment the electrical sensor preferably consists of two field plates which are arranged symmetrically to the zero position of the seismic mass in such a way that when the relative movement begins and there is a reduction of the magnetic flux of one field plate, the magnetic flux of the other field plate increases to the same degree.

To increase the preliminary potential on the stationary magnetic field, the magnetic field may be focused on the electrical sensor by soft iron parts. This also creates increased sensitivity. In a special embodiment of this invention the seismic mass consists of a soft iron part which is arranged so that it oscillates between the other soft iron parts, wherein two field plates are placed in the two air gaps. The sensitivity is likewise increased by this duplication in the arrangement. It is obvious that this principle can be extended and thus a multiple or cascade arrangement can be achieved.

In a further embodiment of this invention the seismic mass can be designed as a permanent magnet, while the soft iron parts are arranged on the housing side. In all these embodiments it is always the intention to create a magnetic field, being constant in strength and form, displace this magnetic field in an acceleration-dependent fashion, and measure the change in the magnetic field.

An additional measurement arrangement of high sensitivity consists of placing a permanent magnet system on the housing side, and an additional permanent magnet system as the seismic mass or part thereof. The perturbation of the magnetic field takes place by means of the additional magnetic field. The field plates in the air gaps of the permanent magnet system provided on the housing side are arranged perpendicularly to its magnetic flux and perpendicularly to the direction of movement of the seismic mass. If desired, devices for adjusting or readjusting the relative position may be present. The arrangement must be made so that the pole axes of the second permanent magnet system in the zero position correspond with the center planes of the field plates. By using two magnetic fields a reversal of direction of the added magnetic flux portions takes place. In this manner a device is realized which is characterized by particularly sharp response to accelerations.

Figure 8:
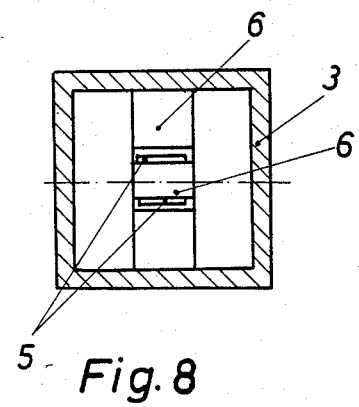
Figure 9:
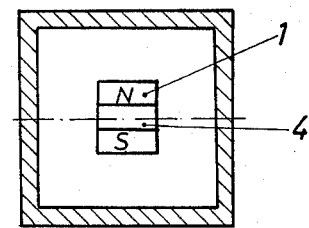
Figure 10:
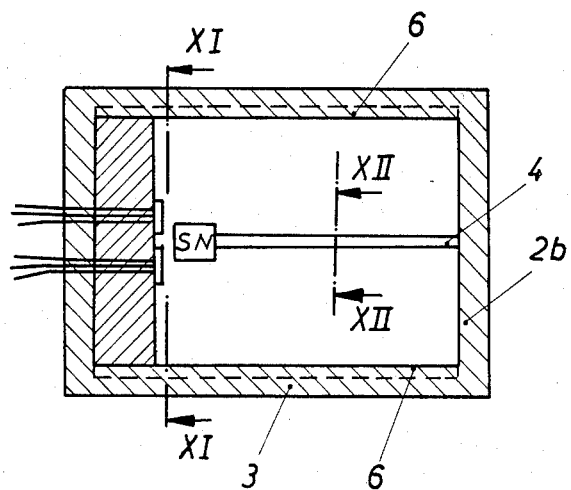
Figure 11:
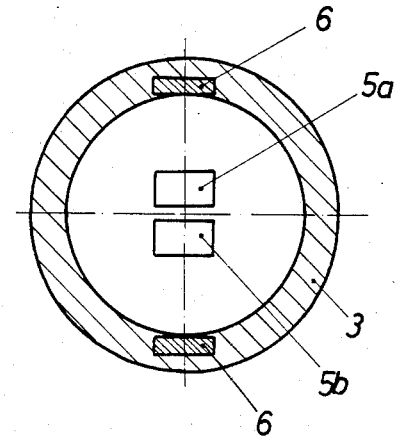

Various devices are set forth in the attached drawings in illustration of this invention; however, they should not be construed as a limitation thereof. The devices are described in greater detail in the following figures:

FIG. 1: A cross section taken through a device in a first embodiment of this invention;

FIG. 2: A section taken along line II—II in FIG. 1;

FIG. 3: A section taken along line III—III in FIG. 1;

FIG. 4: a section taken through the device in a second embodiment of this invention;

FIG. 5: A section taken along line V—V in FIG. 4;

FIG. 6: A section taken along line VI—VI in FIG. 5;

FIG. 7: A section taken through a device in a third embodiment of this invention;

FIG. 8: A section taken along line VIII—VIII in FIG. 7;

FIG. 9: A section taken along line IX—IX in FIG. 7;

FIG. 10: A section taken through a device in a fourth embodiment of this invention;

FIG. 11: A section taken along line XI—XI in FIG. 10; and

Figure 12:
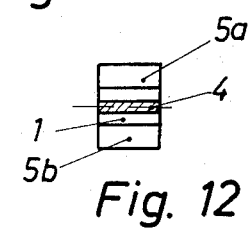

FIG. 12: A section taken along line XII—XII in FIG. 10.

The first embodiment of this invention forms the basis of FIGS. 1 to 3, and has a seismic mass 1, which is suspended or supported elastically on the housing 3 by means of a leaf spring 4. The housing 3 has the faces 2a and 2b and is otherwise formed as the envelope of a cylinder. In the area of the end of the housing 3, adjacent to the face end 2a, the permanent magnet 7 is supported in fixed position, bearing the field plates 5a and 5b in the air gap 8 facing the seismic mass 1. The seismic mass 1 can consist of soft iron, as is illustrated by soft iron part 6, which is located adjacent to the face side 2b. A deflection of the seismic mass 1, under the influence of an acceleration, is expressed in a relative movement in relation to the permanent magnet 7 in the direction of the arrow 9. An essential factor is the arrangement of the field plates 5a and 5b in relation to the geometric form of the seismic mass 1, as is particularly visible in the projection of the parts above one another as shown in FIG. 3. In the case of the field plates 5a and 5b, magnetic field-dependent ohmic resistances are involved so that the apparatus undergoes a change in resistance under the influence of a variable magnetic field. However, since field plates in and of themselves are known, it is not necessary to describe them in further detail or discuss the transformation of the change in resistance into a corresponding electrically measurable voltage. In particular, however, it is recognizable from FIG. 3 that the one plate 5a upon relative movement of the seismic mass 1 is struck by a greater magnetic field, while conversely the other field plate 5b is struck by a smaller magnetic field, and vice versa.

In the second exemplified embodiment of the invention which forms the basis of FIGS. 4 to 6, the magnetic flux is conveyed or focused by the addition of more soft iron parts 6. The housing 3 of the device is fastened to the oscillating body 10. On the housing side where the permanent magnet 7 is supported, there are soft iron parts 6. Four field plates 5a, 5b are arranged in the manner shown. The seismic mass 1 in turn also consists of a soft iron, and is elastically supported on the spring 4 in the air gap between two soft iron parts 6. As a result of the more intense direction of the magnetic field achieved with the aid of the soft iron parts 6, the field plates 5a, 5b are subjected to a more intense preliminary potential, i.e., operation in a steeper curve section of the characteristic curve is made possible, so that the sensitivity is increased.

The embodiment of the invention which forms the basis of FIGS. 7 to 9 is characterized by the fact that two magnetic fields are generated or established. The first magnetic field is construed with the aid of the two permanent magnets 7 and carried by the soft iron parts 6 and focused in the area of the field plates 5. The seismic mass 1 is suspended on the spring 4, which is now designed as a permanent magnet, so that it makes available a second magnetic field, which upon movement of the seismic mass 1 relative to the field plates 5 or to the permanent magnet 7 influences their magnetic field. This embodiment of the device is characterized by particularly high sensitivity.

FIGS. 10 to 12 show a fourth embodiment of the invention. Here the seismic mass 1 is designed as a permanent magnet and suspended from the spring 4. Thus the magnetic field is moved. In the area of a soft iron part 6 the two field plates 5a and 5b are supported in a fixed position, with precisely the dimensions and the relative position as shown in FIG. 12. Additional soft iron parts 6 can be inlaid in the housing 3 in order to better conduct the magnetic flux.

Although the invention has been described merely on the basis of exemplified embodiments with field plates, it is clear that Hall generators may also be used instead of the field plates. In this case as well, magnetic field-dependent sensors are known to be involved.

We claim:

1. In a device for measuring acceleration of a vibrating body, the device able to detect very small acceleration, and in which the relative motion between a resiliently suspended seismic mass, made of a ferromagnetic material, and the associated housing, which is connected to the vibrating body is converted into an electric measurement voltage, by means of at least two ohmic resistance means which are dependent on a magnetic field, and by means of a magnetic field in an air gap between the seismic mass and the housing, said magnetic field being generated by means of at least one permanent magnet and being constant in its intensity and configuration, said resistance means being prestressed by the stationary magnetic field which permeates them and being arranged symmetrically with respect to the zero position of the seismic mass in such a manner that, when relative motion occurs and the magnetic flux through one resistance means is reduced, the magnetic flux through the other resistance means is increased, the improvement wherein said resistance means is arranged perpendicularly to the lines of flux of the magnetic field in the air gap, with their longitudinal axes perpendicular to the direction of motion of the seismic mass and in that the size and the arrangement of the seismic mass is matched to the dimensions and the arrangement of said resistance means in such a manner that, even when the relative motion occurs, the projection of the seismic mass onto the resistance means moves within the areas onto which these resistance means are attached, resulting in a reduction in the magnetic flux passing through one resistance means equal in magnitude to the increase in the magnetic flux passing through the other resistance means, said device providing a linear relationship between the acceleration and the measurement voltage.

2. A device according to claim 1, wherein the magnetic field is focused onto said resistance means by means of soft iron parts so as to increase the prestressing by means of the stationary magnetic field.

3. A device according to claim 1 or 2, wherein the stationary magnetic field is formed by means of a permanent magnet which is mounted in contact with the housing, and the seismic mass is arranged so that it can vibrate perpendicularly to the polar axis of the permanent magnet, said resistance means being located on the permanent magnet in the air gap.

4. A device according to claim 2, wherein said seismic mass is designed as a permanent magnet, and the soft iron parts are located in contact with the housing.

5. In a device for measuring accelerations on vibrating bodies, in which the relative motion between a resiliently suspended seismic mass, made of a ferromagnetic material, and the associated housing, which is connected to the vibrating body is converted into an electric measurement voltage, by means of at least two ohmic resistance means which are dependent on a magnetic field, and by means of a magnetic field in an air gap between the seismic mass and the housing, said magnetic field being generated by means of at least one pemanent magnet and being constant in its intensity and configuration, said resistance means being prestressed by the stationary magnetic field which permeates them and being arranged symmetrically with respect to the zero position of the seismic mass in such a manner that, when relative motion occurs and the magnetic flux through one resistance means is reduced, the magnetic flux through the other resistance means is increased, the improvement wherein said resistance means is arranged perpendicularly to the lines of flux of the magnetic field in the air gap, with their longitudinal axes perpendicular to the direction of motion of the seismic mass and in that the size and the arrangement of the seismic mass is matched to the dimensions and the arrangement of said resistance means in such a manner that, even when the relative motion occurs, the projection of the seismic mass onto the resistance means moves within the areas onto which these resistance means are attached, resulting in a reduction in the magnetic flux passing through one resistance means equal in magnitude to the increase in the magnetic flux passing through the other resistance means, wherein the magnetic field is focused onto said resistance means by means of soft iron parts so as to increase the prestressing by means of the stationary magnetic field and wherein said seismic mass consists of a soft iron part which is arranged so as to permit vibration, between the other soft iron parts and in the two resistance means are located, in each case, in two air gaps.

* * * * *